United States Patent Office 2,727,897
Patented Dec. 20, 1955

2,727,897
DIOXO-PYRROLIDINES

Karl Hoffmann, Binningen, and Ernst Sury, Basel, Switzerland, assignors to Ciba Pharmaceutical Products, Inc., Summit, N. J.

No Drawing. Application January 28, 1953,
Serial No. 333,826

Claims priority, application Switzerland February 8, 1952

8 Claims. (Cl. 260—295)

This invention relates to the manufacture of 3-phenyl-3-pyridyl-(2')-2:5-dioxo-pyrrolidines of the formula

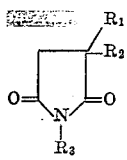

wherein $R_1$ represents a pyridyl-(2)-radical, $R_2$ a phenyl radical and $R_3$ hydrogen or a lower alkyl radical, such as methyl or ethyl, primarily of 3-phenyl-3-pyridyl-(2')-2:5-dioxo-pyrrolidine, and their tertiary amine acid salts and quaternary alkyl pyridinium salts. The two substituents in 3-position may also be substituted, for example by alkyl, substituted hydroxyl and amino groups or halogen atoms.

These new compounds possess valuable pharmacological properties and are intended for use as medicaments, particularly as anticonvulsives. Thus 3-phenyl-3-pyridyl-(2')-2:5-dioxo-pyrrolidine possesses a pronounced anticonvulsive effect.

The specified dioxo pyrrolidines are obtained when 2 - phenyl - 2 - pyridyl - (2') - butane - 1:4 - diacids, or mononitriles or quaternary compounds of either are reacted e. g. with ammonia or alkylamines. The said pyrrolidines are also obtained by reaction of mononitriles with acid agents, such as sulfuric acid in glacial acetic acid.

Dioxopyrrolidines obtained according to the invention which are unsubstituted on the ring nitrogen atom, can also be subsequently substituted by lower alkyl radicals in 1-position, as by reaction with reactive esters of lower alkanols or diazoalkanes, especially diazo methane. As reactive esters of the lower alkanols there can especially be used such of strong organic or inorganic acids, such as hydrohalic acids or organic sulfonic acids, for example hydrochloric acid or para-toluene sulfonic acid. The specified subsequent substitution preferably takes place in the presence of condensing agents which are capable of forming metal compounds with the dioxopyrrolidines, such as alkali and alkaline earth metals, for example sodium, lithium, calcium or their amides, hydrides, hydrocarbon compounds or alcoholates, for example sodamide, sodium hydride, lithium butyl, potassium phenyl, lithium phenyl, potassium tertiary butylate or potassium tertiary amylate.

When in the resulting compounds the pyridine nitrogen is tertiary, the compounds can be converted into alkyl pyridinium salts, for example by treating them with alkyl halides, such as methyl or ethyl chloride, bromide or iodide, or also dialkyl sulfates, such as dimethyl sulfate or diethyl sulfate, or alkyl or aryl sulfonic acid esters, such as para-toluene sulfonic acid methyl ester.

According to the method of working, the new compounds are obtained in the form of the free bases or their salts. From the latter the free pyridine or pyridinium bases can be produced in the customary manner. Conversely, from the latter, by reaction with acids which are suitable for the formation of therapeutically useful or non-toxic salts, salts can be produced, as for example those of the hydrohalic acids, sulfuric acid, nitric acid, phosphoric acid, thiocyanic acid, acetic acid, propionic acid, oxalic acid, malonic acid, succinic acid, malic acid, methane sulfonic acid, ethane sulfonic acid, hydroxyethane sulfonic acid, benzene or toluene sulfonic acid, or of therapeutically useful acids.

The following examples illustrate the invention, the relation between part by weight and part by volume being the same as that between the gram and cubic centimeter:

Example 1

115 parts by weight of 2-phenyl-2-pyridyl-(2')-butane-1:4-diacid-monotrile-(1) are dissolved with heating in 250 parts by volume of concentrated aqueous ammonia. The solution is evaporated to a syrupy consistency in a water pump vacuum and then carefully heated under normal pressure to a maximum of 260° C. Ammonia and water are briskly evolved in this operation. When the evolution of ammonia is complete, the whole is allowed to cool and the imide produced dissolved in methanol, filtered through carbon, the solvent evaporated to the commencement of crystallization and in this manner 104 parts by weight are obtained of 3-phenyl-3-pyridyl-(2')-2:5-dioxo-pyrrolidine of the formula

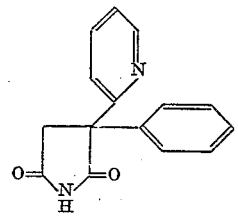

It melts at 128° C. and forms colorless prisms which dissolve in concentrated ammonia, in sodium carbonate solution and in hydrochloric acid.

The hydrochloride is prepared by dissolving 1 part by weight of 3-phenyl-3-pyridyl-(2')-2,5-dioxo-pyrrolidine in 5 parts by volume of absolute ethyl acetate and adding 1 part by volume of ethyl acetate saturated with hydrogen chloride. The hydrochloride formed melts at 110–113° C. with decomposition.

Other salts can be prepared in an analogous manner, for example, those of sulfuric acid or nitric acid.

The 2 - phenyl - 2 - pyridyl - (2') - butane - 1:4-diacid-mononitrile-(1) of decomposition point 97–108° C. specified as starting material in this example, can be prepared, for example, by hydrolysis of 136 parts by weight of 2 - phenyl - 2 - pyridyl - (2') - butane - 1:4 - diacid-monoethyl ester mononitrile-(1) in 250 parts by volume of methanol with 50 parts by weight of potassium hydroxide in 70 parts by volume of water for half an hour. The 2 - phenyl - 2 - pyridyl - (2') - butane - 1,4 - diacid - monoethylester - mononitrile - (1) melts at 87–88° C., boils at 180–183° C. under 0.1 mm. pressure and can be produced by condensation of 149 parts by weight of phenyl-pyridyl-(2)-acetic acid nitrile with 150 parts by weight of ethylbrom acetate in 500 parts by volume of toluene in the presence of 34 parts by weight of sodamide as condensing agent.

Example 2

44 parts by weight of 3-phenyl-3-pyridyl-(2')-2:5-dioxopyrrolidine are dissolved in 150 parts by volume of ethyl acetate and boiled under reflux for 4 hours with 20 parts by volume of dimethyl sulfate. The colorless crystallizate produced is filtered off and recrystallized from methanol-ethyl acetate. It forms colorless needles of M. P. 208–209° C. The product is the easily water-soluble 3 - phenyl - 3 - pyridyl - (2') - 2:5 - dioxopyrrolidine methosulfate of the formula

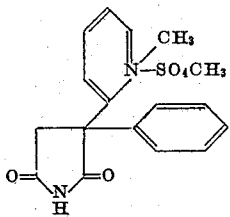

*Example 3*

27.1 parts by weight of 2-phenyl-2-pyridyl-(2')-butane-1:4-diacid are heated in a closed vessel to 200–220° C. with 6.5 parts by weight of methylamine and 20 parts by volume of water. After cooling, the reaction mixture is extracted with chloroform, the chloroform solution washed with water and dried over sodium sulfate, the solvent evaporated and the residue distilled under reduced pressure. The 1-methyl-3-phenyl-3-pyridyl-(2')-2:5-dioxopyrrolidine of the formula

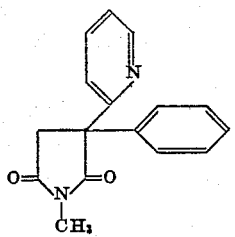

boils at 212–220° C. under 0.1 mm. pressure.

What is claimed is:

1. A member selected from the group consisting of 4-unsubstituted - 1 - R - 3 - phenyl - 3 - pyridyl - (2')-2:5-dioxo-pyrrolidines in which R represents a member selected from the group consisting of hydrogen and lower alkyl groups, their therapeutically useful acid addition salts and quaternary lower alkyl pyridinium salts.

2. 1 - methyl - 3 - phenyl - 3 - pyridyl - (2') - 2:5-dioxopyrrolidine.

3. Quaternary lower alkyl pyridinium salts of 1-methyl - 3 - phenyl - 3 - pyridyl - (2') - 2:5 - dioxopyrrolidine.

4. 3 - phenyl - 3 - pyridyl - (2') - 2:5 - dioxopyrrolidine.

5. Therapeutically useful acid solution salts of 3-phenyl-3-pyridyl-(2')-2:5-dioxopyrrolidine.

6. Quaternary lower alkyl pyridinium salts of 3-phenyl-3-pyridyl-(2')-2:5-dioxopyrrolidine.

7. The hydrochloride of 3-phenyl-3-pyridyl-(2')-2:5-dioxopyrrolidine.

8. The methosulfate of 3-phenyl-3-pyridyl-(2')-2:5-dioxopyrrolidine.

References Cited in the file of this patent

UNITED STATES PATENTS

| | | |
|---|---|---|
| 2,508,332 | Hartman et al. | May 16, 1950 |
| 2,526,231 | Henze | Oct. 17, 1950 |
| 2,566,376 | Shelton et al. | Sept. 4, 1951 |
| 2,567,245 | Sperber et al. | Sept. 11, 1951 |
| 2,576,106 | Cusic | Nov. 27, 1951 |
| 2,585,550 | Hoffmann et al. | Feb. 12, 1952 |
| 2,606,190 | Shelton et al. | Aug. 5, 1952 |
| 2,614,106 | Stoughton | Oct. 14, 1952 |
| 2,626,262 | Lott et al. | Jan. 20, 1953 |
| 2,643,257 | Miller et al. | June 23, 1953 |
| 2,643,258 | Miller et al. | June 23, 1953 |
| 2,643,259 | Miller et al. | June 23, 1953 |

FOREIGN PATENTS

| | | |
|---|---|---|
| 389,948 | Germany | Feb. 9, 1924 |
| 220,960 | Switzerland | Aug. 1, 1942 |
| 220,961 | Switzerland | Aug. 1, 1942 |

OTHER REFERENCES

Miller: J. Am. Chem. Soc., vol. 73, pp. 4895–8 (1951).